United States Patent
Zhang et al.

(10) Patent No.: US 6,606,404 B1
(45) Date of Patent: *Aug. 12, 2003

(54) SYSTEM AND METHOD FOR COMPUTING RECTIFYING HOMOGRAPHIES FOR STEREO VISION PROCESSING OF THREE DIMENSIONAL OBJECTS

(75) Inventors: Zhengyou Zhang, Redmond, WA (US); Charles T. Loop, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/336,222

(22) Filed: Jun. 19, 1999

(51) Int. Cl.[7] .................................................. G06L 9/00
(52) U.S. Cl. ....................................... 382/154; 345/419
(58) Field of Search ................................ 382/100, 154, 382/250, 276, 280, 284, 294; 348/42, 47; 345/419, 426, 427

(56) References Cited

U.S. PATENT DOCUMENTS 5,917,937 A * 6/1999 Szeliski et al. ............. 382/154
6,078,701 A * 6/2000 Hsu et al. .................... 382/294

OTHER PUBLICATIONS

Computing rectifying homographies for stereo vision, Loop et al., Computer vision and pattern recognition, Jun. 1999, pp. 125–131.*

Projective translations and affine stereo calibration, Ruf et al., Computer vision and pattern recognition, Jun. 1998, pp. 475–481.*

Rectifying transformations that minimize resampling effects, Gluckman et al., Computer vision and pattern recognition, Dec. 2001, pp. 111–117.*

Manocha, D. and J. Demmel. Algorithms for intersecting parametric and algebraic curves I: Simple intersections. ACM Transactions on Graphics, 13(1):73–100, 1994.

Robert, L., C. Zeller, O. Faugeras, and M. Hebert. Applications of non–metric vision to some visually–guided robotics tasks. In Y. Aloimonos, editor, Visual Navigation: From Biological Systems to Unmanned Ground Vehicles, chapter 5, pp. 89–134. Lawrence Erlbaum Associates, 1997.

Seitz, S. Image–Based Transformation of Viewpoint and Scene Appearance. PhD thesis, University of Wisconsin, 1997.

Zhang, Z. Determining the epipolar geometry and its uncertainty: A review. *IJCV'98*, vol. 27, No. 2, pp. 161–195, Mar. 1998.

* cited by examiner

Primary Examiner—Samir Ahmed
Assistant Examiner—Vikkram Bali
(74) Attorney, Agent, or Firm—Lyon & Harr, LLP; Richard T. Lyon

(57) ABSTRACT

The present invention is embodied in a system and method for computing rectifying homographies for stereo vision processing of three dimensional (3D) objects. In general, the system and method of the present invention computes 2D projective transforms or homographies derived from specialized projective and affine transforms or components. The affine transform is comprised of a similarity transform and an optional shearing transform for image rectification. During image rectification of the present invention, optimization techniques are used for reducing the distortion.

36 Claims, 7 Drawing Sheets

SYSTEM AND METHOD FOR COMPUTING RECTIFYING HOMOGRAPHIES FOR STEREO VISION PROCESSING OF THREE DIMENSIONAL OBJECTS

BACKGROUND OF THE INVENTION

1. Field of the Invention

The present invention relates in general to object modeling, and in particular to a system and method for computing rectifying homographies for stereo vision processing of three dimensional (3D) objects.

2. Related Art

In the stereo computer vision field, it is typically assumed that a pair of two dimensional (2D) images of a three dimensional (3D) object or environment are taken from two distinct viewpoints. For certain stereo vision computations, the epipolar geometry of the two images is usually determined first and corresponding points between the two images typically need to satisfy an epipolar constraint. Next, for a given point in one image, a search is initiated for its correspondence in the other image along an epipolar line. In general, epipolar lines are not aligned with coordinate axis and are not parallel.

However, such searches are time consuming since the pixels of each image are compared on skewed lines in image space. These types of computations can be simplified and made more efficient if epipolar lines are axis aligned and parallel. This can be realized by applying 2D projective transforms, or homographies, to each image. This process is known as image rectification. In general, image rectification involves applying a pair of two dimensional (2D) projective transforms, or homographies, to a pair of images whose epipolar geometry is known so that epipolar lines in the original images map to horizontally aligned lines in the transformed images.

The pixels corresponding to point features from a rectified image pair will lie on the same horizontal scan-line and differ only in horizontal displacement. This horizontal displacement or disparity between rectified feature points is related to the depth of the feature. As such, rectification can be used to recover 3D structure from an image pair without appealing to 3D geometry notions like cameras. Computations that find dense correspondences are based on correlating pixel colors along epipolar lines. Typically, distinct views of a scene can be morphed by linear interpolation along rectified scan-lines to produce new geometrically correct views of the scene. Thus, image rectification is an important component of stereo computer vision computations and processing.

Some previous techniques for finding image rectification homographies involve 3D constructions. These methods find the 3D line of intersection between image planes and project the two images onto a plane containing this line that is parallel to the line joining the optical centers. However, its realization in practice is difficult because it involves 3D geometric construction. Although a 2D approach exists, it does not optimally reduce distortion effects of image rectification. Instead, the distortion minimization criterion is based on a simple geometric heuristic, which may not lead to optimal solutions.

Therefore, what is needed is an efficient system and method for computing rectifying homographies of 2D images of a 3D object for stereo vision processing of the 3D objects. What is also needed is a system and method that rectifies images with optimally reduced distortion.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for computing rectifying homographies for stereo vision processing of three dimensional (3D) objects.

In general, the system and method of the present invention computes 2D projective transforms or homographies derived from specialized projective and affine transforms or components. The affine transform is comprised of a similarity transform and an optional shearing transform for image rectification. During image rectification of the present invention, optimization techniques are used for reducing the distortion.

Namely, first, two-dimensional (2D) images of a three-dimensional (3D) object are obtained. Next, a fundamental matrix between the two images is obtained. The fundamental matrix embodies the epipolar geometry between the images. For each image, a special projective transform is then found that minimizes a well defined projective distortion criteria. Next, for each image, an affine transform is computed. The affine transform is comprised of a similarity and an optional shearing transform.

The similarity transform is found such that it satisfies the constraints for rectification. The shearing transform can be found for further reducing distortion introduced by the projective component. The similarity and optional shearing transforms are combined into a final affine component for each homography. Next, for each homography, the special projective and final affine transforms are combined into the rectifying homography. With the use of the above transforms of the present invention, rectification of each image is produced with minimum distortion.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

Rectification of 2D images of a 3D object of the present invention is produced from projective and affine components of each homography of the 2D images. The projective component of each homography is a special projective component that minimizes a well defined projective distortion criterion. The affine component of each homography is comprised of a pair of simpler transforms, one designed to satisfy the constraints for rectification, the other to further reduce the distortion introduced by the projective component. The special projective and affine components are combined for each homography to rectify the images. The image rectification system and method of the present invention is based on well defined geometric criteria, thus, image distortion due to the rectification is minimized.

II. Exemplary Operating Environment

Figure 1:
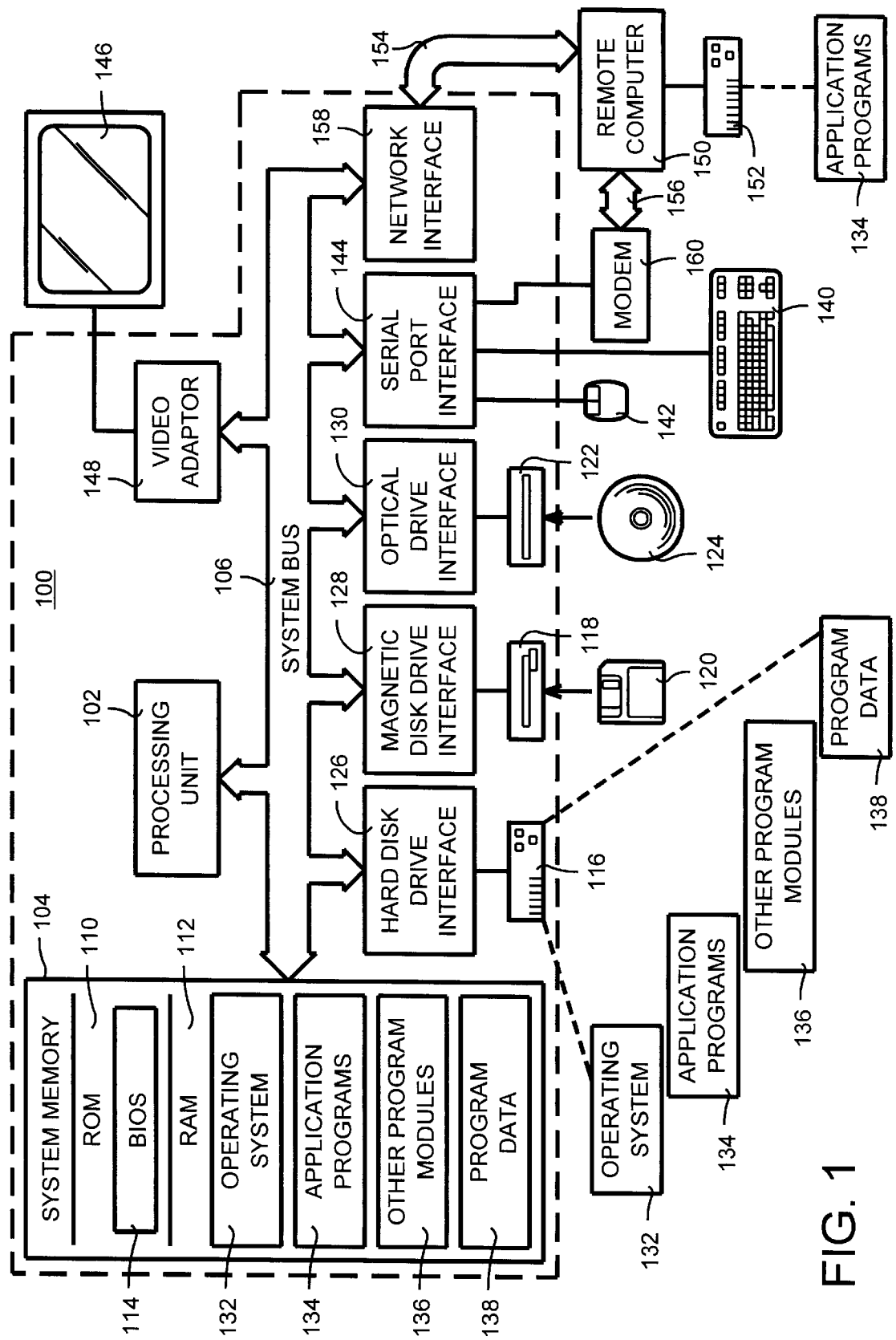
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

III. General Overview

Figure 2:
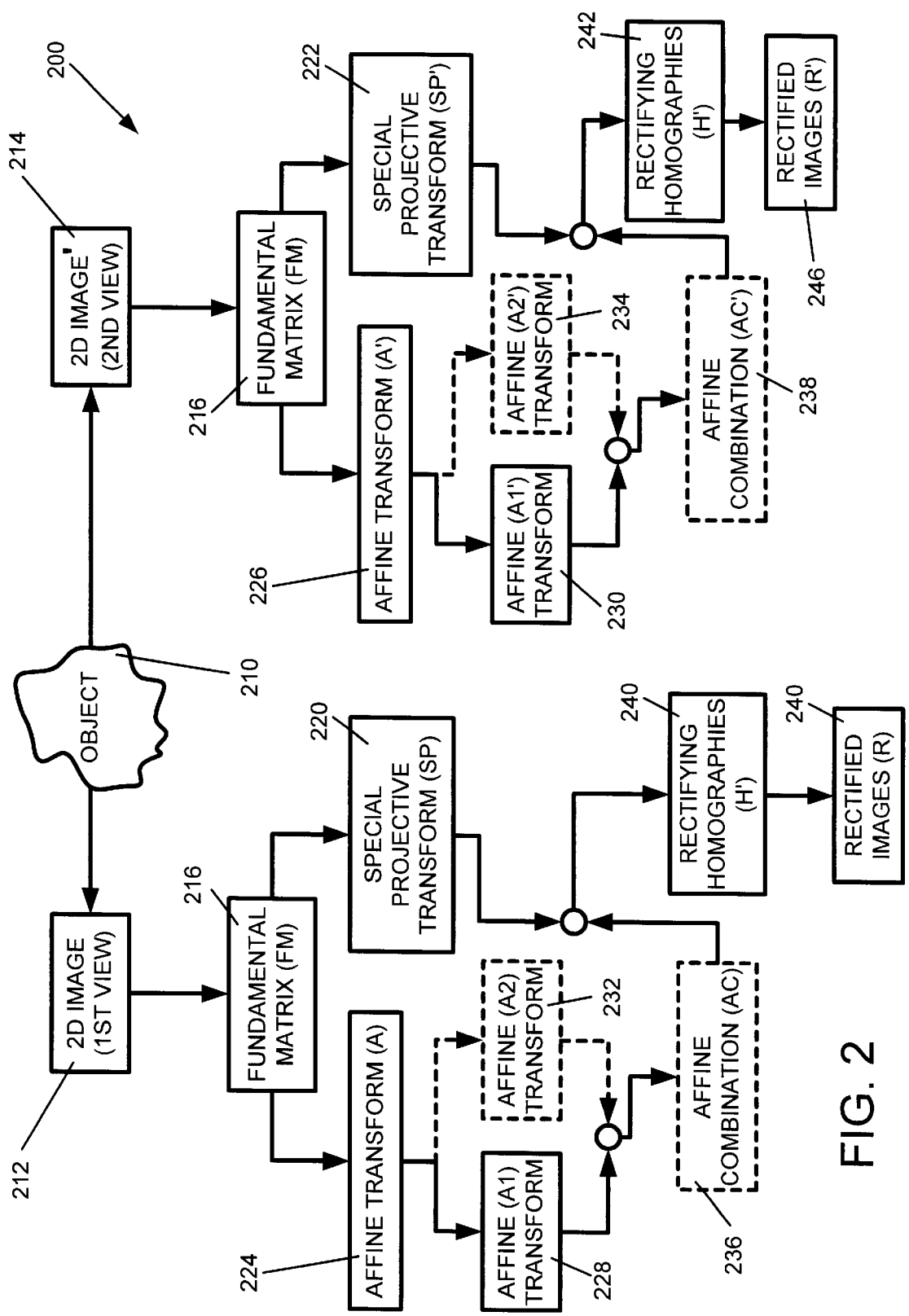
FIG. 2 is an overview block diagram of the present invention.

FIG. 2 is an overview block diagram of the present invention. The present invention is embodied in a system and method for computing rectifying homographies for stereo vision processing of three dimensional (3D) objects. In general, the system 200 of the present invention includes an object 210 represented by multiple 2D images 212, 214. A homography that maps the epipole to a predetermined point for each image is applied to each image. Geometrical representations or the epipolar geometry of the views are obtained as fundamental matrix (FM) 216 between the views 212, 214.

The homographies are comprised of special projective transforms (SP and SP') 220, 222 and affine transforms (A and A') 224, 226. These transforms can be computed based on the fundamental matrix (FM), respectively. The special projective transforms (SP and SP!) 220, 222 are computed so that they minimize a well defined projective distortion criterion. The affine transforms (A and A') 224, 226 are comprised of simpler transforms (A1 and A1') 228, 230 that are designed to satisfy the constraints for rectification. In addition, the affine transforms (A and A') 224, 226 can be comprised of optional affine transforms (A2 and A2') 232, 234 to further reduce the distortion introduced by the projective component.

The affine transforms (A1 and A2 and A1' and A2') are combined to produce affine combinations (AC and AC') 236, 238. The special projective transforms (SP and SP') 220, 222 are combined with the affine combinations (AC and AC') 236, 238 to compute the rectifying homographies (H and H') 240, 242 to produce rectified images (R and R') 244, 246. The discussion below describes the details of the system and method of the present invention.

IV. Details of Components and Operation

The following discussion assumes 2D projective workspace. Points and lines are represented by lower-case bold symbols, e.g. p (point) and l (line). The coordinates of points and lines are represented by 3D column vectors, e.g. $p=[p_u p_v p_w]^T$ and $l=[l_a l_b l_c]^T$. The individual coordinates are sometimes ordered u, v, w for points, and a, b, c for lines. Transforms on points and lines are represented by 3×3 matrices associated with bold upper case symbols, e.g. T. Unless identified to the contrary, matrix entries are given sub-scripted upper-case symbols, e.g. $T_{11}, T_{12}, \ldots, T_{33}$. Pure scalar quantities are given lower-case Greek symbols. As projective quantities, points and lines are scale invariant, meaning $p=\alpha p (\alpha \neq 0)$ represents the same point. Points with w-coordinates equal to zero are affine vectors, directions or points at ∞. Points with a non-zero w-coordinate are affine points when the scale has been fixed so that $p=[p_u p_v 1]^T$. The set of all affine points is the affine plane. For the following discussion, the image plane is considered to be an affine plane where points are uniquely identified by u and v, and w are presumed to be equal to one.

A. Epipolar Geometry

Figure 3:
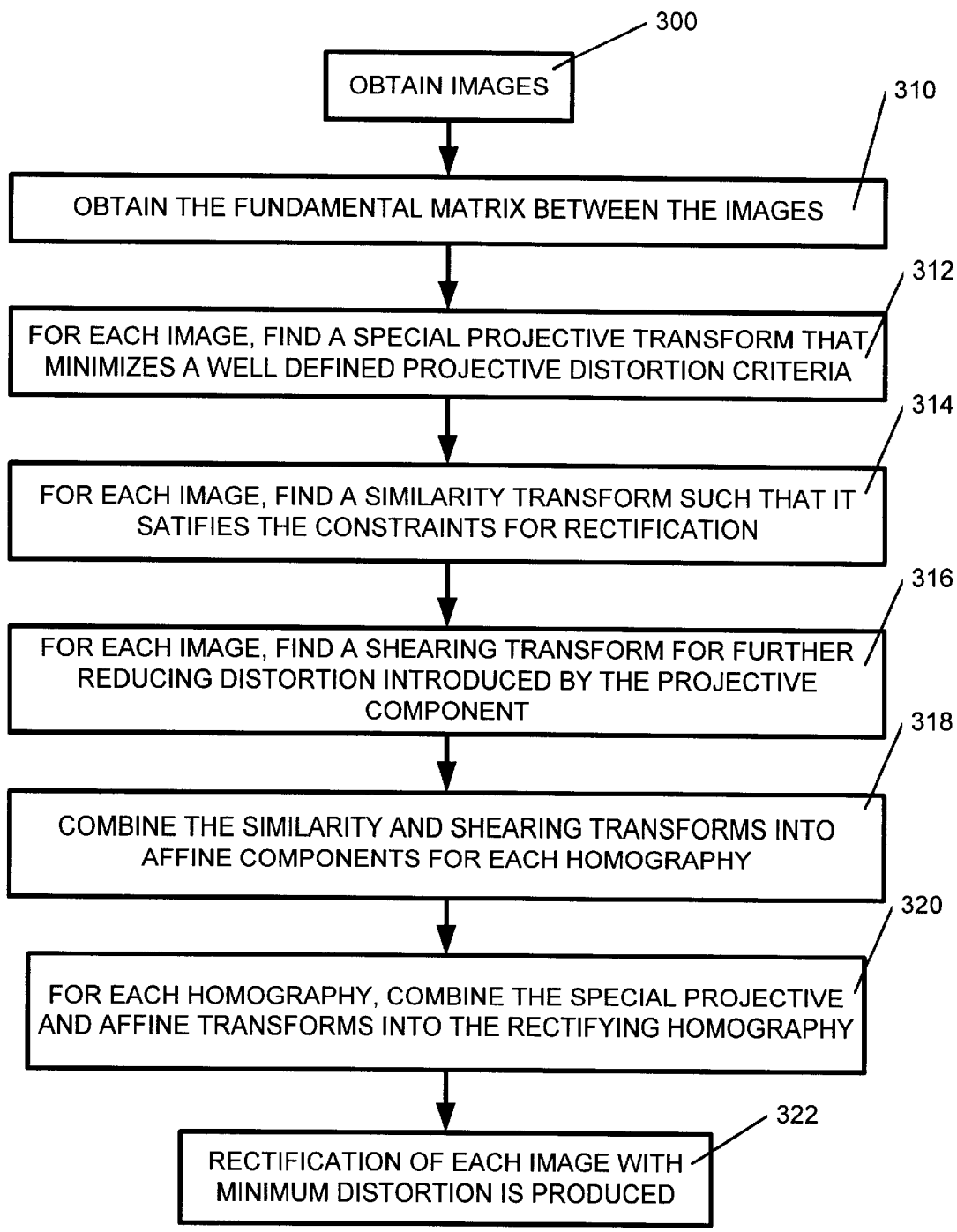
FIG. 3 shows an operational and functional overview of the present invention.
Figure 4:
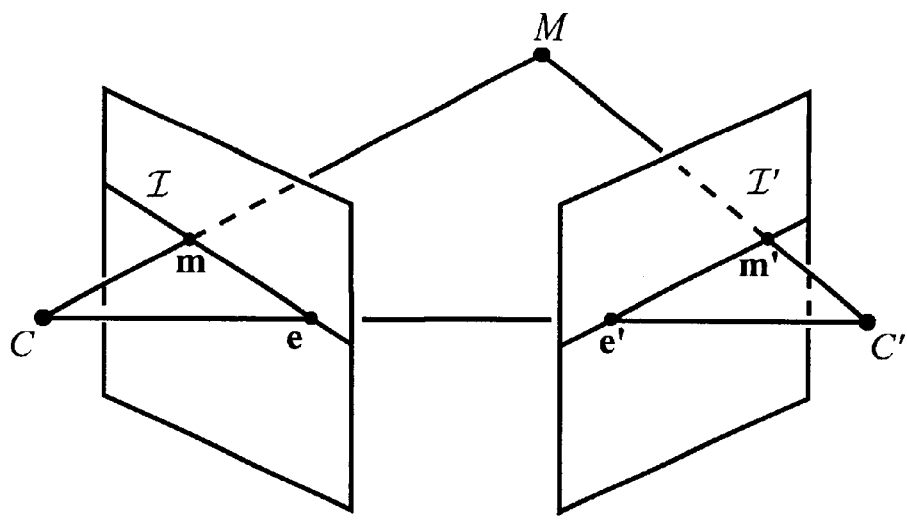
FIGS. 4–5 illustrate the epipolar geometry of the multiple views of the present invention.
Figure 5:
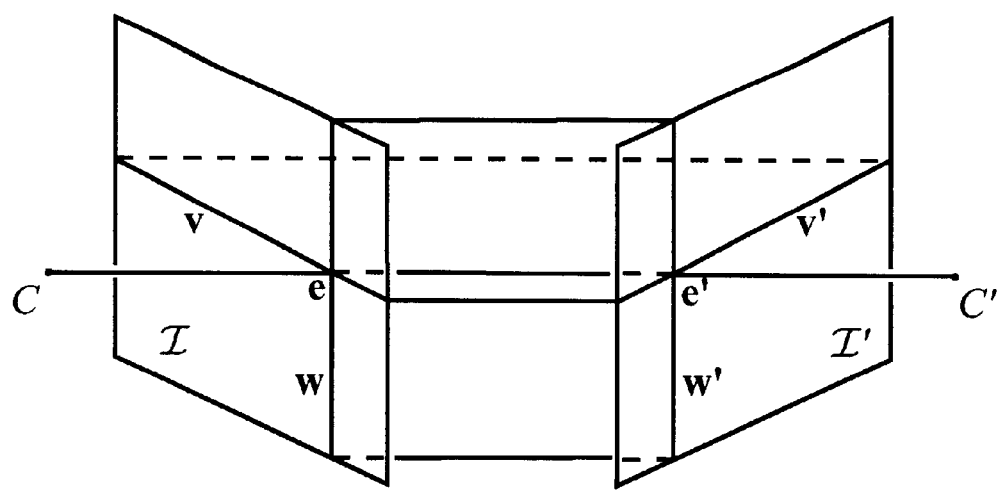

FIG. 3 shows an operational and functional overview of the present invention. In general, first, images such as two-dimensional (2D) images of a three-dimensional (3D) object are obtained (step 300). Second, a fundamental matrix between the two images is obtained (step 310). The fundamental matrix embodies the epipolar geometry between the images. The epipolar geometry between a pair of images can be defined by setting C and C' as a pair of pinhole cameras in 3D space and letting m and m' be the projections through cameras C and C' of a 3D point M in images I and I' respectively. The geometry of these definitions is shown in FIGS. 4 and 5.

Namely, the epipolar constraint is defined by:

$$m'^T F m = 0, \tag{1}$$

for all pairs of images correspondences m and m', where F is the fundamental matrix.

The fundamental matrix F is a 3×3 rank −2 matrix that maps points in I to lines in I', and points in I' to lines in I'. That is, if m is a point in I, then Fm=1' is an epipolar line in I' since from Eq. (1), $m'^T 1'=0$. In fact, any point m' that corresponds with m lies on the epipolar line Fm. For a fundamental matrix F, there exists a pair of unique points e∈I and e'∈I' such that:

$$Fe=0=F^T e' \tag{2}$$

where $0=[000]^T$ is the zero vector. The points e and e' are the epipoles of images I and I' respectively. The epipoles have the property that all epipolar lines in I pass through e, similarly all epipolar lines in I' pass through e'.

In 3D space, e and e' are the intersections of the line C C' with the planes containing image I and I'. The set of planes containing the line C C' are the epipolar planes. Any 3D point M not on line C C' will define an epipolar plane, the intersection of this epipolar plane with the plane containing I or I' will result in an epipolar line, as shown in FIG. 4.

In the following discussion, it is assumed that F is known. An overview of techniques to find F is described in "Determining the Epipolar Geometry and its Uncertainty: A Review," by Z. Zhang, *International Journal of Computer Vision*, 27(2):161–1195, 1998, which is incorporated herein by reference. If the intrinsic parameters of a camera are known, the images are calibrated, and the fundamental matrix becomes the essential matrix. The rectification system and method of the present invention is suitable for calibrated or uncalibrated images pairs, provided that F is known between them.

B. Image Rectification

After the fundamental matrix is obtained, the images can be rectified. Image rectification is the process of transforming the epipolar geometry of a pair of images into a canonical form. This is accomplished by applying a homography to each image that maps the epipole to a predetermined point. The point is defined as $i=[100]^T$ (a point at $\infty$), and the fundamental matrix for a rectified image pair is defined, as discussed above, by the expression:

$$F = [i]_x = \begin{bmatrix} 0 & 0 & 0 \\ 0 & 0 & -1 \\ 0 & 1 & 0 \end{bmatrix}$$

The notation $[x]_x$ is used to denote the antisymetric matrix representing the cross product with x. From the above, the rectified images have the following two properties: 1) All epipolar lines are parallel to the u-coordinate axis and 2) Corresponding points have identical v-coordinates. These properties are useful in practice since rectification maps epipolar lines to image scan-lines. Other conventions for canonical epipolar geometry can be useful under special circumstances.

For image rectification in accordance with the present invention, H and H' are defined as the homographies to be applied to images I and I' respectively, and m∈I and m'∈I' are a pair of points that satisfy Eq. (1). It is noted that rectified image points $\bar{m}$ and $\bar{m}'$ define:

$$\bar{m}=Hm \text{ and } \bar{m}'=H'm'.$$

It follows from Eq. (1) that:

$$\bar{m}'^T F \bar{m}=0,$$

$$m'^T \underbrace{H'^T F H}_{F} m = 0,$$

resulting in the factorization $$F=H'^T[i]_x H.$$

Note that the homographies H and H' that satisfy Eq. (3) are not unique. However, in accordance with the present invention, a pair of homographies H and H' are found to minimize image distortion.

Namely, u, v and w are lines equated to the rows of H such that:

$$H = \begin{bmatrix} u^T \\ v^T \\ w^T \end{bmatrix} = \begin{bmatrix} u_a & u_b & u_c \\ v_a & v_b & v_c \\ w_a & w_b & w_c \end{bmatrix}. \quad (4)$$

Similarly, lines u', v', and w' are equated to the rows of H'. As such, by definition:

$$He=[u^T e \; v^T e \; w^T e]^T=[100]^T.$$

This means that the lines v and w contain the epipole e. Similarly v' and w' contain the other epipole e'. Further, lines v and v', and lines w and w' are corresponding epipolar lines. This has a simple geometric interpretation as illustrated in FIG. 5. This result establishes a linkage between the homographies H and H', which is important when minimizing distortion caused by rectification.

Namely, corresponding epipolar lines are related by a direction in one image and the second and third rows of a pair of rectifying homographies correspond to pairs of corresponding epipolar lines. In the discussion that follows, the symbol ~ is used to indicate correspondence. First, l∈I and l'∈I' are defined as a pair of epipolar lines. If l~l' and x∈I is a direction (point at $\infty$) such that $l=[e]_x x$ then $$l'=Fx.$$

This can be shown by letting x be the intersection of lines l and $k=[001]^T$ (the line at $\infty$), found by $x=[k]_x l$. Similarly, let $x'=[k]_x l'$. As such, $l=[e]_x x$, since $[e]_x[k]_x l=l$. Since l~l', it follows that $x'^T Fx=0$. By definition $e'^T l'=e'^T Fx=0$ and $x'^T l'= x'^T Fx=0$, which shows that lines l' and Fx both contain points e' and x' and must be the same line. In the following, we denote the rows of H and H' as in Eq. (4), and $i=[100]^T$.

Next, if H and H' are homgraphies such that $$F=H'^T[i]_x H, \quad (A)$$

then v~v' and w~w'. For example, expanding $H'^T[i]xH$, shows that $$F = \begin{bmatrix} v_a w'_a - v'_a w_a & v_b w'_a - v'_a w_b & v_c w'_a - v'_a w_c \\ v_a w'_b - v'_b w_a & v_b w'_b - v'_b w_b & v_c w'_b - v'_b w_c \\ v_a w'_c - v'_c w_a & v_b w'_c - v'_c w_b & v_c w'_c - v'_c w_c \end{bmatrix}.$$

It should be noted that F does not depend on u or u'. Without loss of generality, the following expression u=k=u', can be set where $k=[001]^T$ is the line at $\infty$. As such, up to a scale factor $H^{-1}=[[v]_x w \; [w]_x u \; [u]_x v]$. Since v and w are independent (follows from Eq. (A)) and both contain e, it can be concluded that $[v]_x w=e$. If $y=[v]_x k$ and $z=[w]_x k$. From Eq. (A) the following expression is produced:

$$H'^T[i]_x=FH^{-1}$$

$$[k \; v' \; w'][i]_x=F[e \; z-y]$$

$$[0 \; w'-v']=[0 \; Fz-Fy]. \quad (B)$$

It is concluded that v'=Fy and w'=Fz. Consequently, it follows that v~v' and w~w'.

In general, the system and method of the present invention achieves image rectification by combining specialized projective and affine transforms. After the fundamental matrix is obtained (as shown in FIG. 3), a special projective transform is found for each image that minimizes a well defined projective distortion criteria (step 312). Next, for each image, a first affine transform is found such that it satisfies the constraints for rectification (step 314). Optionally, for each image, a second affine transform can be found for further reducing distortion introduced by the projective component (step 316).

The first and second affine transforms can then be combined into a final affine component for each homography (step 318). Next, for each homography, the special projective and final affine transforms are combined into the rectifying homography (step 320). With the use of the above transforms of the present invention, rectification of each image is produced with minimum distortion (step 322).

C. Decomposition of the Homographies

In particular, rectifying homographies H and H' are computed in accordance with the present invention by decomposing the homographies into simpler transforms, as shown generally in FIG. 2. Each component transform is then computed to achieve a desired effect and satisfy some conditions.

First, the scale invariant homography H is equated with a scale variant counterpart:

$$H = \begin{bmatrix} u_a & u_b & u_c \\ v_a & v_b & v_c \\ w_a & w_b & 1 \end{bmatrix}, \quad (5)$$

by dividing out $w_c$. Similarly $w'_c$ can be divided out from H'. This will not lead to difficulties arising from the possibility that $w_c$ or $w'_c$ be equal to zero since it is assumed that the image coordinate system origin is near the image. As such, the minimization procedure will tend to keep the lines w and w' away from the images.

H is decomposed into $$H = H_a H_p,$$

where $H_p$ is a special projective transform and $H_a$ is an affine transform. Thus, the following is defined:

$$H_p = \begin{bmatrix} 1 & 0 & 0 \\ 0 & 1 & 0 \\ w_a & w_b & 1 \end{bmatrix}. \quad (6)$$

From Eqs. (5) and (6) it follows that:

$$H_a = H H_p^{-1} = \begin{bmatrix} u_a - u_c w_a & u_b - u_c w_b & u_c \\ v_a - v_c w_a & v_b - v_c w_b & v_c \\ 0 & 0 & 1 \end{bmatrix}.$$

The definitions of $H'_a$ and $H'_p$ for the other homography for the second image are similar but with primed symbols.

Next, $H_a$ (similarly $H'_a$) can be further decomposed into:

$$H_a = H_s H_r$$

where $H_r$ is a first affine transform, such as a similarity transformation, and $H_s$ is a second affine transform, such as a shearing transformation. The transform $H_r$ will have the form:

$$H_r = \begin{bmatrix} v_b - v_c w_b & v_c w_a - v_a & 0 \\ v_a - v_c w_a & v_b - v_c w_b & v_c \\ 0 & 0 & 1 \end{bmatrix} \quad (7)$$

and the transform $H_s$ will have the form:

$$H_s = \begin{bmatrix} s_a & s_b & s_c \\ 0 & 1 & 0 \\ 0 & 0 & 1 \end{bmatrix}$$

Note that $H_s$ only effects the u-coordinate of a point, therefore it will not effect the rectification of an image. The following discussion describes the computation of each component transform defined above.

1. Special Projective Transform

Figure 6:
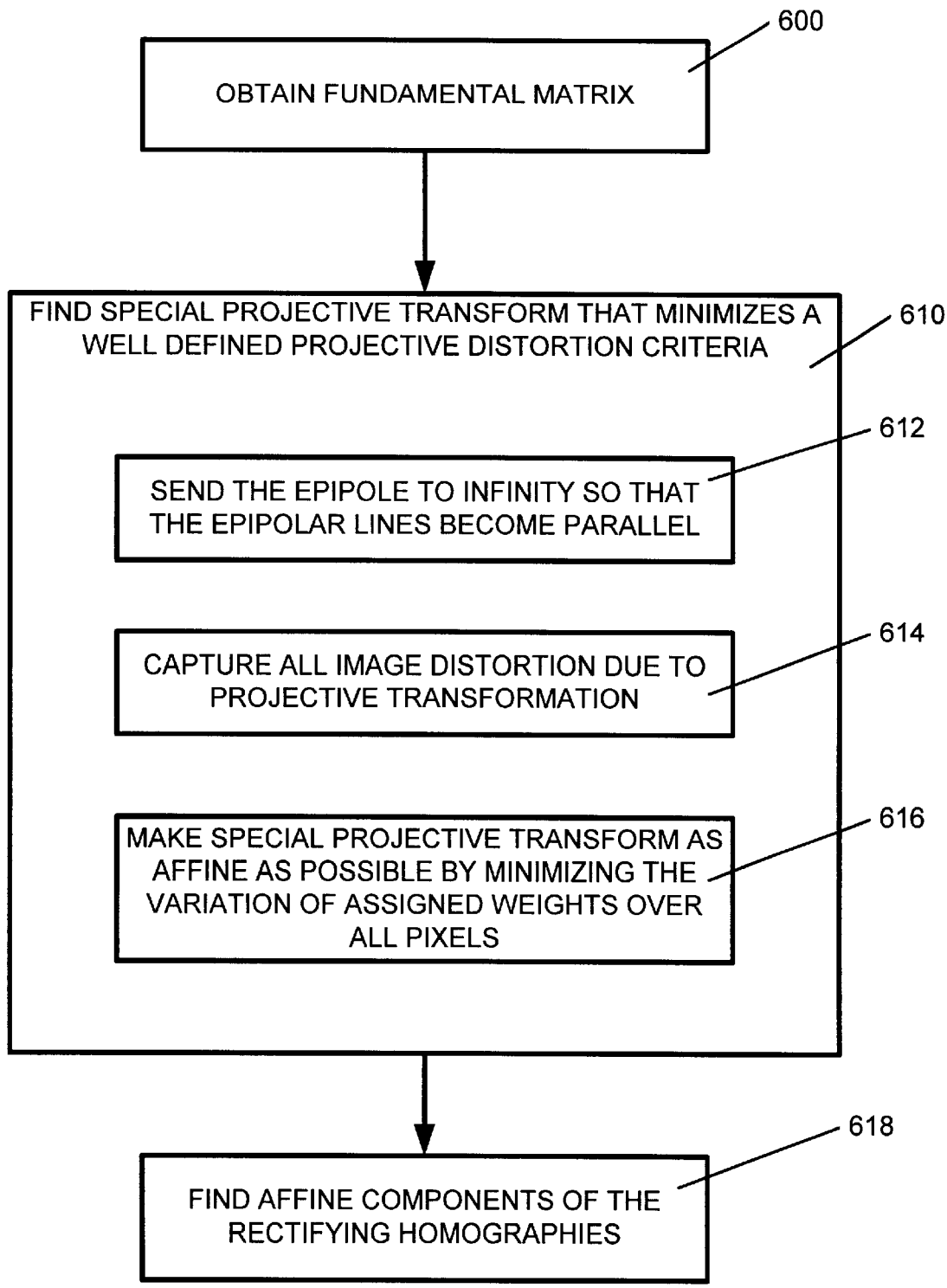
FIG. 6 illustrates the operational and functional details of one transform of the present invention.

FIG. 6 illustrates the operational and functional details of one transform of the present invention. In general, once the fundamental matrix is obtained (step 600), the special projective transform is found such that it minimizes a well defined projective distortion criteria (step 610). This includes sending the epipole to infinity so that the epipolar lines become parallel (step 612), capturing all image distortion due to projective transformation (step 614) and making the special transformation as affine as possible by minimizing the variation of assigned weights over all pixels (step 616).

Specifically, the special projective transforms $H_p$ and $H'_p$ completely characterize the projective components of H and H'. These transforms map the epipoles e and e' to points at ∞ (points with w-coordinates equal to zero). By definition, $H_p$ and $H'_p$ are determined by lines w and w' respectively. The lines w and w' are not independent. Given a direction $z=[\lambda,\mu,0]^T$ in image I, the following is found:

$$w=[e]_\times z \text{ and } w'=Fz. \quad (8)$$

This result follows from the correspondence of w and w' as epipolar lines (as discussed above). Any such z will define a pair of corresponding epipolar lines and the parameter z is found that minimizes distortion, to be defined below.

Let $p_i = [p_{i,u}, p_{i,v}, 1]^T$ be a point in the original image. This point will be transformed by $H_p$ to point $$\left[\frac{p_{i,u}}{w_i}, \frac{p_{i,v}}{w_i}, 1\right]^T$$

with weight $$w_i = w^T p_i.$$

If the weights assigned to points are identical then there is no projective distortion and the homography is necessarily an affine transform. In order to map the epipole e from the affine (image) plane to a point at ∞, $H_p$ is not, in general, affine. However, as the image is bounded $H_p$ can be made as affine as possible. This is the basis of the distortion minimization criterion.

a) Distortion Minimization Criterion

Although identical weights usually do not exist in general (except when the epipole is already at ∞), the variation of the weights assigned to a collection of points over both images can be minimized. All the pixels from both images are preferably used as a collection, but some other subset of important image points could also be used if necessary. The variation is measured with respect to the weight associated with the image center. More formally, the following is computed:

$$\sum_{i=1}^{n} \left[\frac{w_i - w_c}{w_c}\right]^2, \quad (9)$$

where $w_c = w^T p_c$ and where $$p_c = \frac{1}{n} \sum_{i}^{n} = 1$$

$p_i$ is the average of the points. This measure will be zero if the weights for all the points are equal, occurring only if $H_p$ is an affine map, and the epipole is already at ∞. By minimizing Eq. (9) it follows that $H_p$ and $H'_p$ are as close to affine as possible over the point set $p_i$.

Over one image, Eq. (9) can be written as $$\sum_{i=1}^{n} \left[\frac{w^T(p_i - p_c)}{w^T p_c}\right]^2,$$

or as a matrix equation:

$$\frac{w^T P P^T w}{w^T p_c p_c^T w}, \quad (10)$$

where P is the 3×n matrix $$P = \begin{bmatrix} p_{1,u} - p_{c,u} & p_{2,u} - p_{c,u} & \cdots & p_{n,u} - p_{c,u} \\ p_{1,v} - p_{c,v} & p_{2,v} - p_{c,v} & \cdots & p_{n,v} - p_{c,v} \\ 0 & 0 & \cdots & 0 \end{bmatrix}.$$

The matrices $p'_c$ and P' are similarly defined for the other image. Since $w=[e]_x$ and $w'=Fz$, Eq. (10) can be rewritten over both images as:

$$\frac{z^T \overbrace{[e]_x^T P P^T [e]_x}^{A} z}{z^T \underbrace{[e]_x^T P_c P_c^T [e]_x}_{B} z} + \frac{z^T \overbrace{F^T P' P'^T F}^{A'} z}{z^T \underbrace{F^T P'_c P'_c{}^T F}_{B'} z} \quad (11)$$

or $$\frac{z^T A z}{z^T B z} + \frac{z^T A' z}{z^T B' z},$$

where A, B, A', and B' are 3×3 matrices that depend on the point sets. $p_i$ and $p'_i$. Since the w-coordinate of z is equal to zero, the upper-left 2×2 blocks of these matrices are important. In the following discussion of this section, the expression $z=[\lambda, \mu]^T$ is denoted.

The specific point set corresponding to a whole image is considered below. It is assumed that an image is a collection of pixel locations denoted $$p_{i,j}=[i \ j \ 1]^T,$$

where $i=0, \ldots, w-1$ and $j=0, \ldots, h-1$, and w and h are the width and height of image I. The image center is the point $$p_c = \left[\frac{w-1}{2} \frac{h-1}{2} 1\right]^T.$$

The primed counter-parts, I', for image I are similarly defined. Under these assumptions, the upper-left 2×2 block of $PP^T$ is reduced to the following simple form:

$$PP^T = \frac{wh}{12} \begin{bmatrix} w^2 - 1 & 0 \\ 0 & h^2 - 1 \end{bmatrix},$$

and $$p_c p_c^T = \frac{1}{4} \begin{bmatrix} (w-1)^2 & (w-1)(h-1) \\ (w-1)(h-1) & (h-1)^2 \end{bmatrix}.$$

Using these results, the 2×2 matrices A, B, A', and B' in can be computed in Eq. (11).

b) Minimization

Solving z by minimizing Eq. (11) is a nonlinear optimization problem. For example, $z=[\lambda,\mu]^T$ is defined up to a scalar factor. Without loss of generality, the present invention can set u=1. (If $\mu$ is much smaller than $\lambda$, the system can set $\lambda=1$, but the following discussion is still applicable). Quantity (11) is minimized when the first derivative with respect to $\lambda$ is equal to 0. This produces a polynomial of degree 7, because (11) is the sum of two rational functions, each the ratio of quadratic polynomials. The root can be found iteratively starting from an initial guess.

The initial guess is obtained as follows. First, $z^T Az/z^T Bz$ and $z^T A'z/z^T B'z$ are minimized separately (see discussion below), which produces two different estimations of z, denoted by $\hat{z}_1$ and $\hat{z}_2$. Their average $(\hat{z}_1/\|\hat{z}_1\|+\hat{z}_2/\|\hat{z}_2\|)/2$, is used as the initial guess of z. This average is close to the optimal solution. Minimizing $z^T Az/z^T Bz$ is equivalent to maximizing $z^T Bz/z^T Az$, denoted by f(z). As A is symmetric and positive-definite, it can be decomposed as $A=D^T D$. Let y=Dz. Then, f(z) becomes $$\hat{f}(y) = \frac{y^T D^{-T} B D^{-1} y}{y^T y}.$$

Since y is defined up to a scale factor, $\|y\|=1$ can be imposed, and $\hat{f}(y)$ is maximized when y is equal to the eigenvector of $D^{-T}BD^{-1}$ associated with the largest eigen-value. Finally, the solution for z is given by $z=D^{-1}y$. Exactly the same procedure can be applied to find z which minimizes $z^T A'z/z^T B'z$.

2. Affine Transforms

Figure 7:
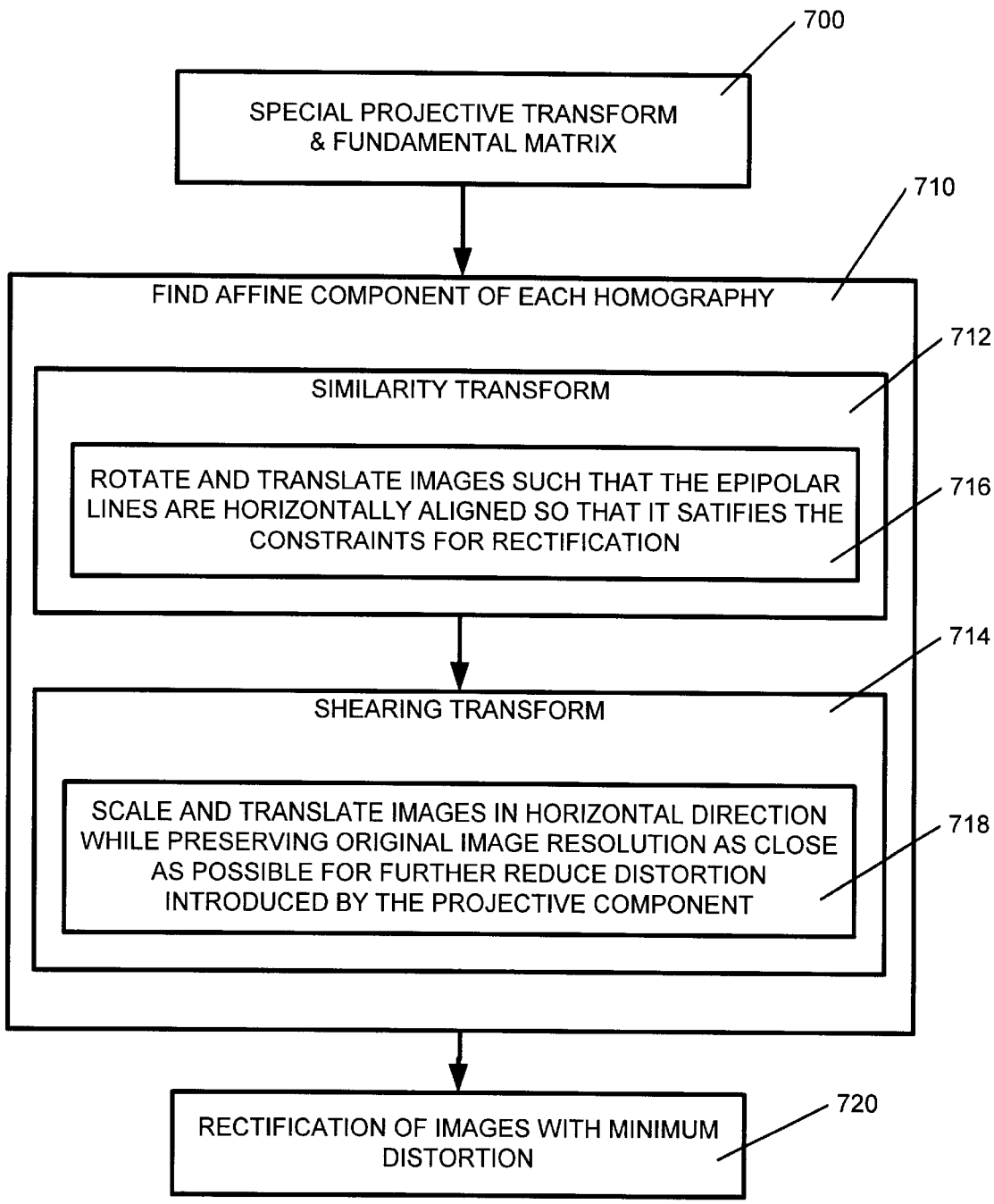
FIG. 7 illustrates the operational and functional details of other transforms of the present invention.

FIG. 7 illustrates the operational and functional details of other transforms of the present invention. In general, after the special projective transform and fundamental matrix is obtained (step 700), affine components of each homography is computed (step 710). The affine components are comprised of at least a similarity transform 712 and optionally a shearing transform 714 for each image, as described in FIGS. 2 and 3.

The similarity transform 712 is preferably found by rotating and translating images such that the epipolar lines are horizontally aligned so that it satisfies the constraints for rectification (step 716). The optional shearing transform is preferably found by scaling and translating the images in a horizontal direction while preserving original image resolution as close as possible for further reducing distortion introduced by the projective component (step 718).

a. Similarity Transform

Specifically, as discussed above, the transforms $H_p$ and $H'_p$ were found that map the epipoles e and e' to points at $\infty$. In the discussion that follows, a pair of similarity transforms $H_r$ and $H'_r$ are defined that rotate these points at $\infty$ into alignment with the direction $i=[100]^T$ as required for rectification. Additionally, a translation in the v-direction on one of the images is found to exactly align the scan-lines in both images. At this stage, it is assumed that the lines w and w' are known. Therefore, $v_a$ and $v_b$ can be eliminated from Eq. (7) by making use of the following:

$$F = H'^T [i]_x H \quad (12)$$

$$= \begin{bmatrix} v_a w'_a - v'_a w_a & v_b w'_a - v'_a w_b & v_c w'_a - v'_a \\ v_a w'_b - v'_b w_a & v_b w'_b - v'_b w_b & v_c w'_b - v'_b \\ v_a - v'_c w_a & v_b - v'_c w_b & v_c - v'_c \end{bmatrix}.$$

Using the last row of this matrix equation, it can be determined that:

$$v_a = F_{31} + v'_c w_a, \quad (13)$$

$$v_b = F_{32} + v'_c w_b, \quad (14)$$

$$v_c = F_{33} + v'_c. \quad (15)$$

Eqs. (13–15) are substituted into Eq (7), resulting in:

$$H_r = \begin{bmatrix} F_{32} - w_b F_{33} & w_a F_{33} - F_{31} & 0 \\ F_{31} - w_a F_{33} & F_{32} - w_b F_{33} & F_{33} + v'_c \\ 0 & 0 & 1 \end{bmatrix}. \quad (16)$$

Similarly, $v'_a$ and $v'_b$ can be eliminated to get:

$$H'_r = \begin{bmatrix} F_{23} - w'_b F_{33} & w'_a F_{33} - F_{13} & 0 \\ F_{13} - w'_a F_{33} & F_{23} - w'_b F_{33} & v'_c \\ 0 & 0 & 1 \end{bmatrix}. \quad (17)$$

Note that there remains a translation term involving $v'_c$ in Eqs. (17) and (16). This shows that translation in the v-direction is linked between the two images, and that an offset of $F_{33}$ is needed to align horizontal scan-lines. As such, $v'_c$ is found so that the minimum v-coordinate of a pixel in either image is zero. As similarity transforms, $H_r$ and $H'_r$ can only rotate, translate, and uniformly scale the images I and I'. None of these operations introduce any additional distortion. The combined transforms $H_r H_p$ and $H'_r H'_p$ are sufficient to rectify images I and I'. However, there remains additional freedom, corresponding to u and u' of Eq. (4). These elements take the form of shearing transforms (described below) that can be optionally used to reduce distortion and to map the images into a more practical pixel range.

b. Shearing Transform

For the shearing transform, the freedom afforded by the independence of u and u' is exploited to reduce the distortion introduced by the projective transforms $H_p$ and $H'_p$. Due to this independence, only one image is discussed for brevity since the same procedure is identically performed on both images. The effect of u is modeled as a shearing transform:

$$S = \begin{bmatrix} a & b & 0 \\ 0 & 1 & 0 \\ 0 & 0 & 1 \end{bmatrix}.$$

The translation components of S are set to zero since these terms add no useful freedom at this stage. Let $$a = \begin{bmatrix} \frac{w-1}{2} & 0 & 1 \end{bmatrix}^T, \quad b = \begin{bmatrix} w-1 & \frac{h-1}{2} & 1 \end{bmatrix}^T,$$

$$c = \begin{bmatrix} \frac{w-1}{2} & h-1 & 1 \end{bmatrix}^T, \text{ and } d = \begin{bmatrix} 0 & \frac{h-1}{2} & 1 \end{bmatrix}^T$$

be points corresponding to the midpoints of the edges of I. Further, let $\hat{a} = H_r H_p a$, be a point in the affine plane by dividing through so that $\hat{a}_w = 1$. It is noted that $\hat{b}$, $\hat{c}$ and $\hat{d}$ are similarly defined.

In general, $H_p$ is a projective transform, so it is not possible to undistort I completely using the affine transform S. Instead perpendicularity is preserved and aspect ratio of the lines bd and ca. Let $$x = \hat{b} - \hat{d},$$

$$y = \hat{c} - \hat{a}.$$

As the difference of affine points, x and y are vectors in the euclidean image plane. Perpendicularity is preserved when $$(Sx)^T(Sy) = 0, \quad (18)$$

and aspect ratio is preserved if $$\frac{(Sx)^T(Sx)}{(Sy)^T(Sy)} = \frac{w^2}{h^2}. \quad (19)$$

Eqs. (18) and (19) represent quadratic polynomials in a and b (the unknown elements of S) whose simultaneous satisfaction is required. Using the method outlined in "Algorithms for intersecting parametric and algebraic curves 1: Simple intersections, by D. Manocha and J Demmel, *ACM Transactions on Graphics*, 13(1):73–100, 1994, which is incorporated herein by reference, the real solution $$a = \frac{h^2 x_v^2 + w^2 y_v^2}{hw(x_v y_u - x_u y_v)} \text{ and } b = \frac{h^2 x_u x_v + w^2 y_u y_v}{hw(x_u y_v - x_v y_u)},$$

is found up to sign; the solution where a is positive is preferred. $H_s$ (and similarly $H'_s$) is defined to be composed with a uniform scaling and translation as described below.

The combined transform $H_s H_r H_p$ and similarly $H'_s H'_r H'_p$, rectify images I and I' with minimal distortion. However these image may not be the appropriate size, or in the most desirable coordinate system. Therefore, additional uniform scaling and translation may be applied. It is important that the same scale factor, and the same v-translation be applied to both images to preserve rectification. Translations in the u-direction have no effect on rectification. In the example below, a uniform scale factor is chosen that preserves the sum of image areas. Other criteria may work equally well. Translations are also computed in u so that the minimum pixel coordinate has a u-coordinate of zero. A similar translation is found for the v direction, but the minimum is taken over both images to preserve rectification.

V. WORKING EXAMPLE

The present invention is embodied in a procedure for computing rectification homographies for a pair of images taken from distinct viewpoints of a 3D scene, as discussed in detail above. FIGS. 8–11 are pictures illustrating one working example of the present invention and show the results of each stage of the working example. The present invention is based on quantifiable 2D image measures and does not require 3D constructions. Further, these measures have intuitive geometric meanings. Namely, as discussed above distortion due to the projective component of rectification is minimized, and additional degrees of freedom are used in the affine component to further reduce distortion to a well defined minimum.

Figure 8:
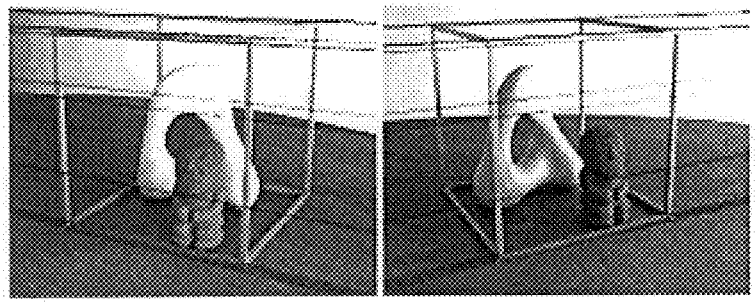
FIGS. 8–11 are pictures illustrating a working example of the present invention.
Figure 9:
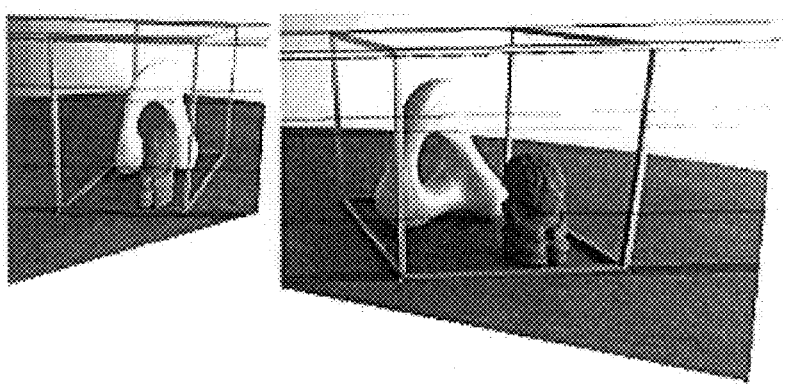
Figure 10:
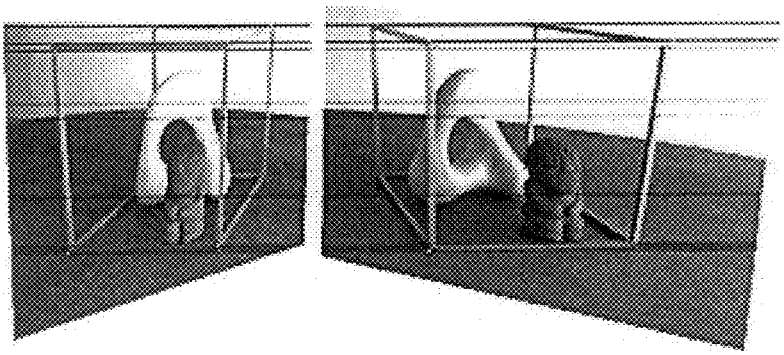
Figure 11:
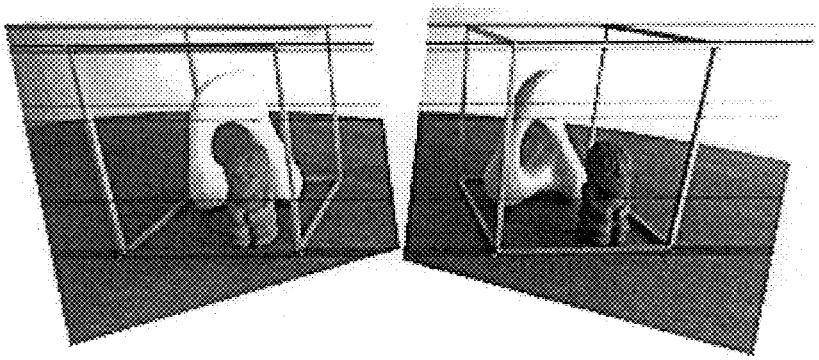

Referring back to FIG. 2 along with FIGS. 8–11, in this working example FIG. 8 shows an original image pair overlaid with several epipolar lines. FIG. 9 shows the image pair transformed by the specialized projective mapping $H_p$ and $H'_p$ 220 and 222. Note that the epipolar lines are now parallel to each other in each image. FIG. 10 shows the image pair transformed by the similarity transform $H_r$ and $H'_r$ 228, 230. Note that the image pair is now rectified (the epipolar lines are horizontally aligned). Last, FIG. 11 shows the final image rectification after shearing transform $H_s$ and $H'_s$ 232, 234. Note that the image pair remains rectified, but the horizontal distortion is reduced.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for computing rectifying homographies of images of an object comprising:
   computing a special projective transform for each image that minimizes a well defined projective distortion criteria;
   computing a similarity transform that satisfies predefined constraints for rectification; and
   combining the special projective transform with the similarity transform into a rectifying homography.

2. The method of claim 1, further comprising obtaining a fundamental matrix between the images.

3. The method of claim 1, wherein the similarity transform is an affine component.

4. The method of claim 1, further comprising computing a shearing transform that further reduces distortion introduced by the rectification.

5. The method of claim 4, further comprising combining the similarity transform with the shearing transform to define an affine component and combining the affine component with the special projective transform into the rectifying homography.

6. The method of claim 2, wherein the fundamental matrix embodies epipolar geometrical relationships between the images.

7. The method of claim 6, further comprising sending epipoles of the epipolar geometrical relationships to infinity so that epipolar lines become parallel by respective special projective transforms.

8. The method of claim 7, further comprising capturing image distortion due to projective transformation by respective special projective transforms.

9. The method of claim 1, wherein respective special projective transforms are computed to characterize projective components of the rectifying homography.

10. The method of claim 6, further comprising mapping the epipoles to points with coordinates of a predetermined coordinate axis equal to zero.

11. A rectification system for processing two-dimensional images of a three-dimensional object comprising:
    a homographical processor that computes a special projective transform of the images comprised of isolated projective characteristics and a similarity transform that satisfies predefined constraints for rectification; and
    a geometrical processor that combines the special projective and similarity transforms into a rectifying homography.

12. The rectification system of claim 11, wherein the homographical processor obtains a fundamental matrix between the images.

13. The rectification system of claim 12, wherein the fundamental matrix embodies epipolar geometrical relationships between the images.

14. The rectification system of claim 13, wherein the similarity transform is computed by rotating and translating the images such that the epipolar lines are horizontally aligned so that it satisfies predefined constraints for rectification.

15. The rectification system of claim 11, wherein the similarity transform is an affine component.

16. The rectification system of claim 11, wherein the homographical processor further computes a shearing transform that reduces distortion introduced by the rectification.

17. The rectification system of claim 16, wherein the geometrical processor combines the similarity transform with the shearing transform to define an affine component and further combines the affine component with the special projective transform into the rectifying homography.

18. The rectification system of claim 16, wherein the shearing transform is computed by scaling and translating the images in a horizontal direction while preserving original image resolution to reduce distortion introduced by the special projective transform.

19. The rectification system of claim 13, wherein the geometrical processor further sends epipoles of the epipolar geometrical relationships to infinity so that epipolar lines become parallel by respective special projective transforms.

20. The rectification system of claim 18, wherein the homographical processor assigns weights to pixel elements defining the images and minimizes variations of the assigned weights over all pixels such that the transformation is near affine.

21. The rectification system of claim 20, wherein respective special projective transforms are computed to characterize projective components of the rectifying homography.

22. The rectification system of claim 20, wherein the homographical processor maps the epipoles to points with coordinates of a predetermined coordinate axis equal to zero.

23. A computer-readable storage device encoded with a set of instructions for rectifying images, the set of instructions comprising:
    isolating projective characteristics of the images defined by a special projective transform;
    obtaining at least one an affine component defined by a similarity transform that satisfies predefined constraints for rectification; and
    combining the transforms into a rectifying homography.

24. The set of instructions of claim 23, wherein the special projective transform is comprised of components that minimize a predefined projective distortion criteria.

25. The set of instructions of claim 23, further comprising obtaining a fundamental matrix between the images.

26. The set of instructions of claim 25, wherein the fundamental matrix embodies epipolar geometrical relationships between the images.

27. The set of instructions of claim 26, further comprising sending epipoles of the epipolar geometrical relationships to infinity so that epipolar lines become parallel by respective special projective transforms.

28. The set of instructions of claim 27, further comprising capturing image distortion due to projective transformation by respective special projective transforms.

29. The set of instructions of claim 28, further comprising assigning weights to pixel elements defining the images and minimizing variations of the assigned weights over predetermined pixels to make the transformation affine by respective special projective transforms.

30. The set of instructions of claim 23, wherein respective special projective transforms are obtained so that they characterize projective components of the rectifying homography.

31. The set of instructions of claim 27, further comprising mapping the epipoles to points with coordinates of a predetermined coordinate axis equal to zero.

32. The set of instructions of claim 25, wherein the similarity transform is obtained by rotating and translating the images such that the epipolar lines are horizontally aligned so that it satisfies predefined constraints for rectification.

33. The set of instructions of claim 23, wherein the similarity transform is an affine component.

34. The set of instructions of claim 23, further comprising obtaining a shearing transform that reduces distortion introduced by the rectification.

35. The set of instructions of claim 34, further comprising combining the similarity transform with the shearing transform to define a multi-part affine component and further combining the multi-part affine component with the special projective transform into the rectifying homography.

36. The set of instructions of claim 34, wherein the shearing transform is obtained by scaling and translating the images in a horizontal direction while preserving original image resolution to reduce distortion introduced by the special projective transform.

* * * * *

UNITED STATES PATENT AND TRADEMARK OFFICE
CERTIFICATE OF CORRECTION

PATENT NO.    : 6,606,404 B1
DATED         : August 12, 2003
INVENTOR(S)   : Zhang et al.

It is certified that error appears in the above-identified patent and that said Letters Patent is hereby corrected as shown below:

Column 5,
Line 43, "SP!" should be changed to -- SP' --

Column 11,
Line 21, "w=[e]$_z$" should be changed to -- w=[e]$_x$z --

Signed and Sealed this

Twenty-fifth Day of November, 2003

JAMES E. ROGAN
*Director of the United States Patent and Trademark Office*